US012704229B2

(12) United States Patent
Yu

(10) Patent No.: US 12,704,229 B2
(45) Date of Patent: Aug. 11, 2026

(54) TRACK, ADAPTER AND TRACK LIGHT

(71) Applicants: SUZHOU OPPLE LIGHTING CO., LTD., Suzhou City (CN); OPPLE LIGHTING CO., LTD., Shanghai (CN)

(72) Inventor: Qie Yu, Suzhou City (CN)

(73) Assignees: Suzhou Opple Lighting Co., Ltd., Suzhou City (CN); Opple Lighting Co., Ltd., Shanghai (CN)

(*) Notice: Subject to any disclaimer, the term of this patent is extended or adjusted under 35 U.S.C. 154(b) by 67 days.

(21) Appl. No.: 18/759,906

(22) Filed: Jun. 30, 2024

(65) Prior Publication Data

US 2024/0353077 A1 Oct. 24, 2024

Related U.S. Application Data

(63) Continuation of application No. PCT/CN2022/139135, filed on Dec. 14, 2022.

(30) Foreign Application Priority Data

Dec. 30, 2021 (CN) ......................... 202111661282.6
Dec. 30, 2021 (CN) ......................... 202123436513.1

(51) Int. Cl.
*F21S 8/00* (2006.01)
*F21V 21/088* (2006.01)
(Continued)

(52) U.S. Cl.
CPC ............ *F21S 8/038* (2013.01); *F21V 21/088* (2013.01); *F21V 21/096* (2013.01); *F21V 21/35* (2013.01); *F21V 23/06* (2013.01)

(58) Field of Classification Search
CPC ........ F21S 8/038; F21V 21/005; F21V 21/35; H01R 25/142; H01R 25/145;
(Continued)

(56) References Cited

U.S. PATENT DOCUMENTS 4,778,397 A * 10/1988 Contant ............... H01R 25/142 439/116
7,744,386 B1 * 6/2010 Speidel ................ H01R 25/145 439/118
(Continued)

FOREIGN PATENT DOCUMENTS

CN 208951792 U 6/2019
CN 111022979 A 4/2020
(Continued)

OTHER PUBLICATIONS

International Search Report of PCT/CN2022/139135 dated Feb. 23, 2023 with English translation.

*Primary Examiner* — Zheng Song
*Assistant Examiner* — James M Endo
(74) *Attorney, Agent, or Firm* — Arch & Lake LLP

(57) ABSTRACT

The present disclosure discloses a track, an adapter, and a track light, in a height direction, a side of the track is provided with an installation portion, and another side of the track is provided with a frame, the frame encloses to form an accommodating space with an opening direction that is away from the installation portion, the installation portion is used to connect with an installation foundation, the accommodating space is used for accommodating an adapter, and the track is provided with a first magnetic attraction piece, the first magnetic attraction piece is used for magnetically connecting with the adapter, and the track is provided with a fastener holder, the track light includes the adapter, adapted to the track.

12 Claims, 5 Drawing Sheets

(51) Int. Cl.

| | |
|---|---|
| ***F21V 21/096*** | (2006.01) |
| ***F21V 21/35*** | (2006.01) |
| ***F21V 23/06*** | (2006.01) |

(58) Field of Classification Search

CPC ................ H01R 25/147; H01R 25/161; H01R 13/6205; H01R 13/6273

See application file for complete search history.

(56) References Cited

U.S. PATENT DOCUMENTS

| | | | | |
|---|---|---|---|---|
| 2003/0003785 | A1* | 1/2003 | Ross | H01R 25/145 439/115 |
| 2013/0273758 | A1* | 10/2013 | Hoffmeister | H01R 25/142 439/111 |
| 2014/0246229 | A1* | 9/2014 | Ross | H01R 25/14 174/70 B |
| 2015/0236462 | A1* | 8/2015 | Davidson, Jr. | H01R 25/142 439/122 |
| 2017/0184290 | A1* | 6/2017 | Chiu | F21V 21/35 |
| 2019/0170334 | A1* | 6/2019 | Stucchi | F21S 8/038 |
| 2020/0326047 | A1* | 10/2020 | De Bevilacqua | H01R 25/145 |

FOREIGN PATENT DOCUMENTS

| | | | |
|---|---|---|---|
| CN | 210891541 | U | 6/2020 |
| CN | 212408585 | U | 1/2021 |
| CN | 213299728 | U | 5/2021 |
| CN | 114151748 | A | 3/2022 |

* cited by examiner

TRACK, ADAPTER AND TRACK LIGHT

CROSS REFERENCES TO RELATED APPLICATIONS

This application is based upon and claims the priority of PCT patent application No. PCT/CN2022/139135 filed on Dec. 14, 2022 which claims priority to the Chinese patent application No. 202123436513.1 filed on Dec. 30, 2021 and the Chinese patent application No. 202111661282.6 filed on Dec. 30, 2021, the entire contents of which are hereby incorporated by reference herein for all purposes.

TECHNICAL FIELD

The present disclosure relates to the technical field of lighting device, in particular to a track, an adapter and a track light.

BACKGROUND

As a kind of lighting device, the track light has been widely used in people's daily life and work.

SUMMARY

The present disclosure discloses a track and an adapter and a track light.

The present disclosure discloses a track, and the track may include, in a height direction, a side with an installation portion, and another side with a frame, where the frame may enclose to form an accommodating space with an opening direction that may be away from the installation portion, the installation portion may be used to connect with an installation foundation, the accommodating space may be used for accommodating an adapter, and the track may be provided with a first magnetic attraction piece, the first magnetic attraction piece may be used for magnetically connecting with the adapter, and the track may be provided with a fastener holder, the fastener holder is used for engaging with the adapter.

The present disclosure discloses an adapter, and the adapter may be used for electrically connecting with a power supply device or a power consumption device and coupled in the abovementioned track, so as to realize that the power supply device or the power consumption device obtains electricity from the track, the adapter may be provided with a second magnetic attraction piece at a top of the adapter and first fasteners at two sides of the adapter, the second magnetic attraction piece may be used for magnetically connecting with the first magnetic attraction piece, the first fasteners include an extended state and a retracted state, and in a case that the first fasteners are in the extended state, the first fasteners are used to engage with the fastener holder, and in a case that the first fasteners are in the retracted state, the first fasteners are used to separate from the fastener holder.

The present disclosure discloses a track light, and the track light may include the abovementioned adapter, which is adapted to the abovementioned track, the track light further may include a power supply device or a power consumption device, the power supply device or the power consumption device may be arranged in the adapter, and the power supply device or the power consumption device may be electrically connected with the adapter.

The second magnetic attraction piece may be used for magnetically connecting with the first magnetic attraction piece, the first fasteners may include an extended state and a retracted state, and in a case that the first fasteners is in the extended state, the first fasteners are used to engage with the fastener holder, and in a case that the first fasteners are in the retracted state, the first fastener is used to separate from the fastener holder.

It is to be understood that both the foregoing general description and the following detailed description are exemplary and explanatory only and are not restrictive of the present disclosure.

BRIEF DESCRIPTION OF DRAWINGS

The accompanying drawings illustrated here are provided to provide a further understanding of the present disclosure and constitute a part of the present disclosure. The illustrative examples of the present disclosure and their descriptions are used to explain the present disclosure and do not constitute an undue limitation of the present disclosure. In the attached drawings.

DETAILED DESCRIPTION

In order to make the purpose, technical solution and advantages of the present disclosure more clear, the technical solution of the present disclosure will be described clearly and completely with examples of the present disclosure and corresponding drawings. The described example is only a part of the examples of the present disclosure, not all examples. Based on the examples in the present disclosure, all other examples obtained by ordinary skilled in the field without creative labor belong to the scope of protection of the present disclosure.

Description of reference used in this disclosure may include:

100—track, 110—accommodating space, 120—first magnetic attraction piece, 130—fastener holder, 140—power supply conductive terminal, 150—signal conductive terminal, 160—insulation protection part, 170—installation portion, 180—frame, 181—top wall, 182—sidewall.

200—adapter, 210—second magnetic attraction piece, 220—first fastener, 230—operating part, 240—housing, 241—top plate, 242—side plate, 243—opening, 244—baffle plate, 251—first spring piece, 252—second spring piece, 260—second fastener, 271—first end, 272—second end, 281—first side surface, 282—second side surface, 291—power supply spring piece, 292—signal spring piece.

300—light body.

The adapter in the track light is magnetically connected with the track through magnetic pieces, which is convenient and fast to install. However, during the use of the track light, if the magnetic attraction between the magnetic pieces disappears, or the weight of the light-emitting module is relatively heavy, the adapter may be separated from the track, and there is a potential safety hazard that the track light falls off.

Figure 1:
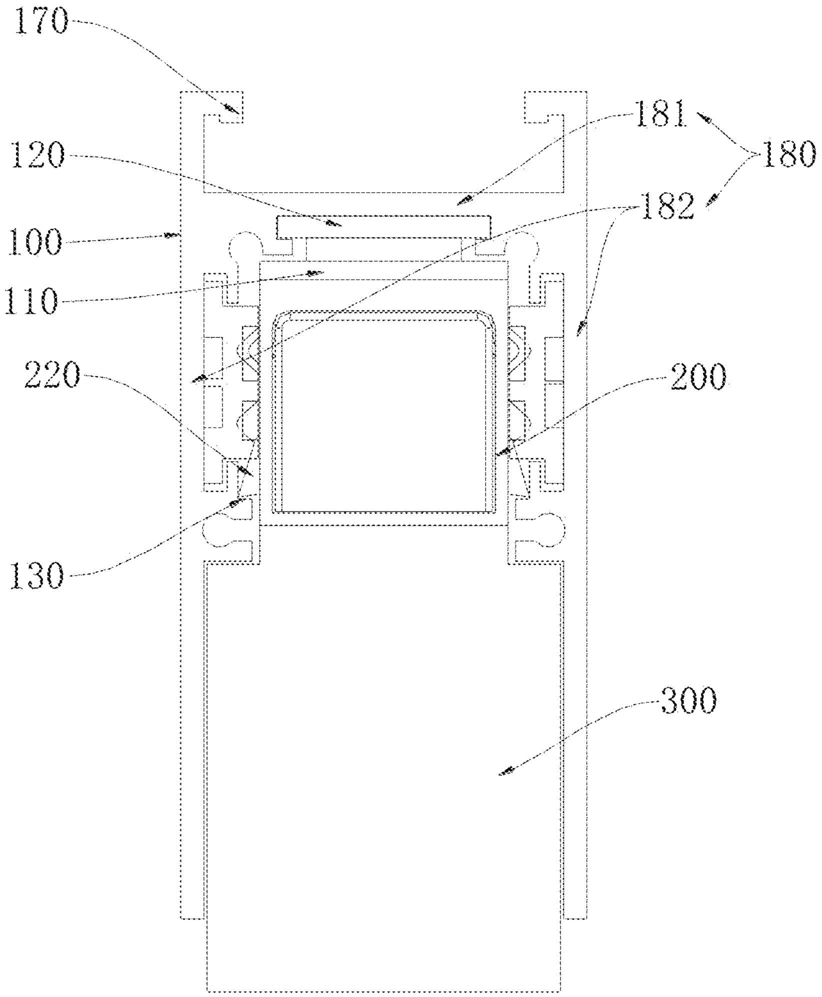
FIG. 1 is a front view of a track light in an example of the present disclosure.
Figure 2:
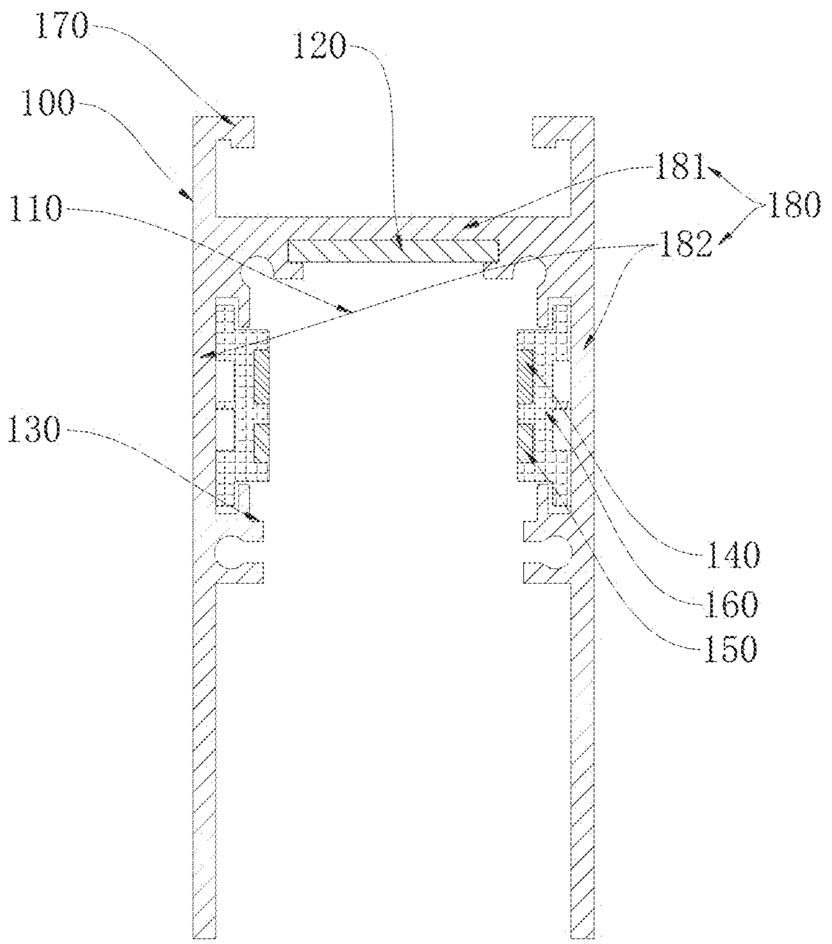
FIG. 2 is a cross-sectional view of a track in an example of the present disclosure.
Figure 3:
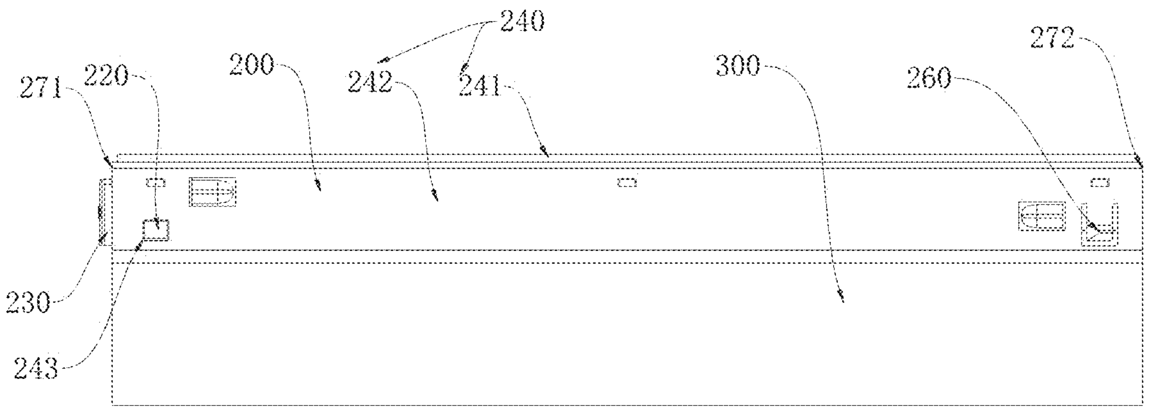
FIG. 3 is a front view of an adapter in an example of the present disclosure.
Figure 4:
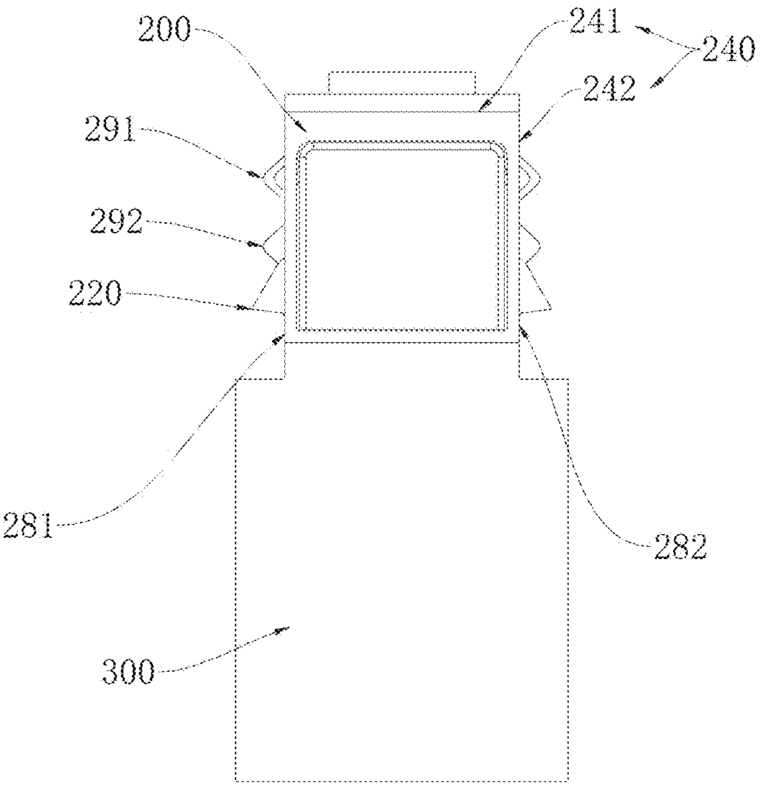
FIG. 4 is a side view of an adapter in an example of the present disclosure.
Figure 5:
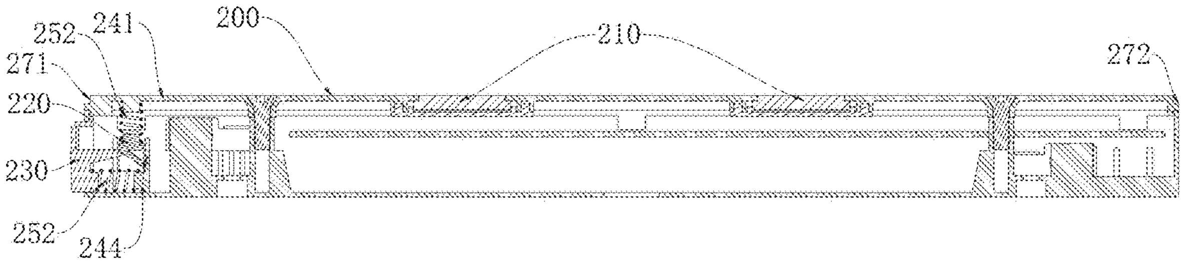
FIG. 5 is a cross-sectional view of a part of an adapter in an example of the present disclosure.
Figure 6:
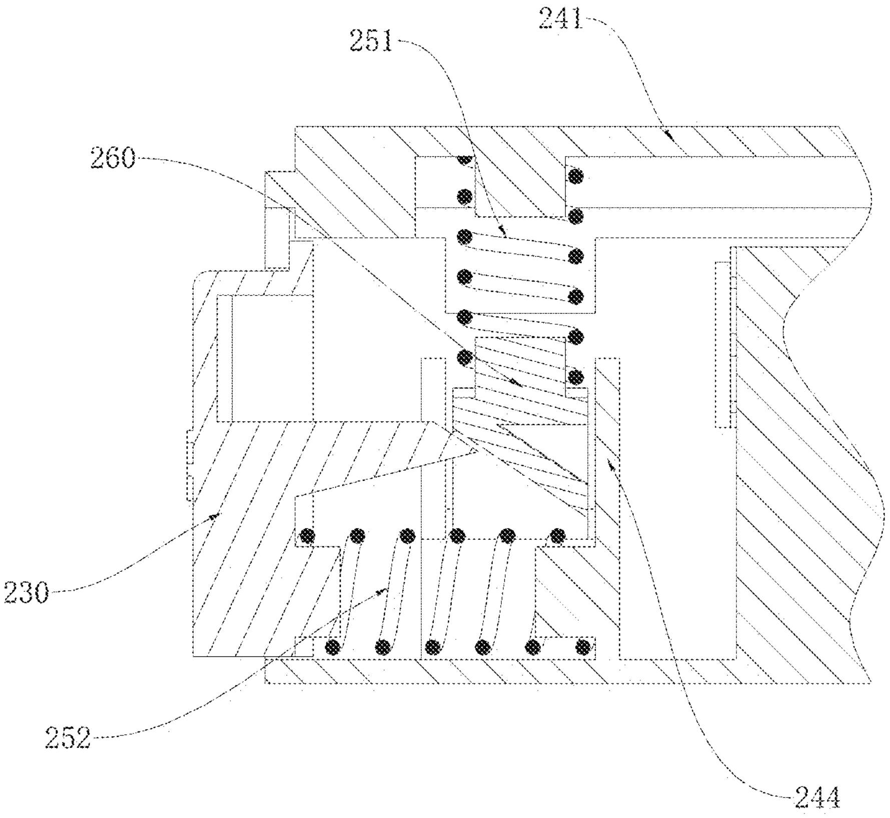
FIG. 6 is a partial enlarged view of FIG. 5.
Figure 7:
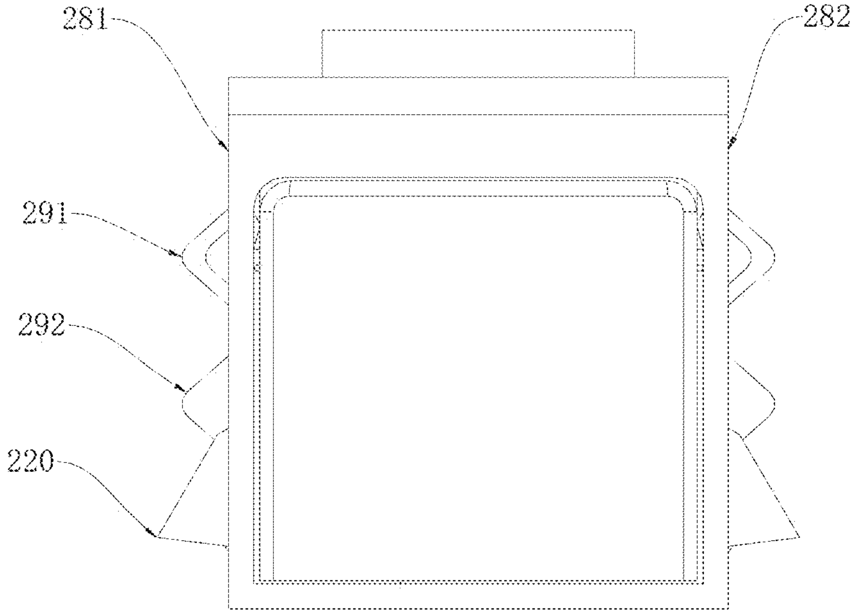
FIG. 7 is a side view corresponding to a state of FIG. 6.
Figure 8:
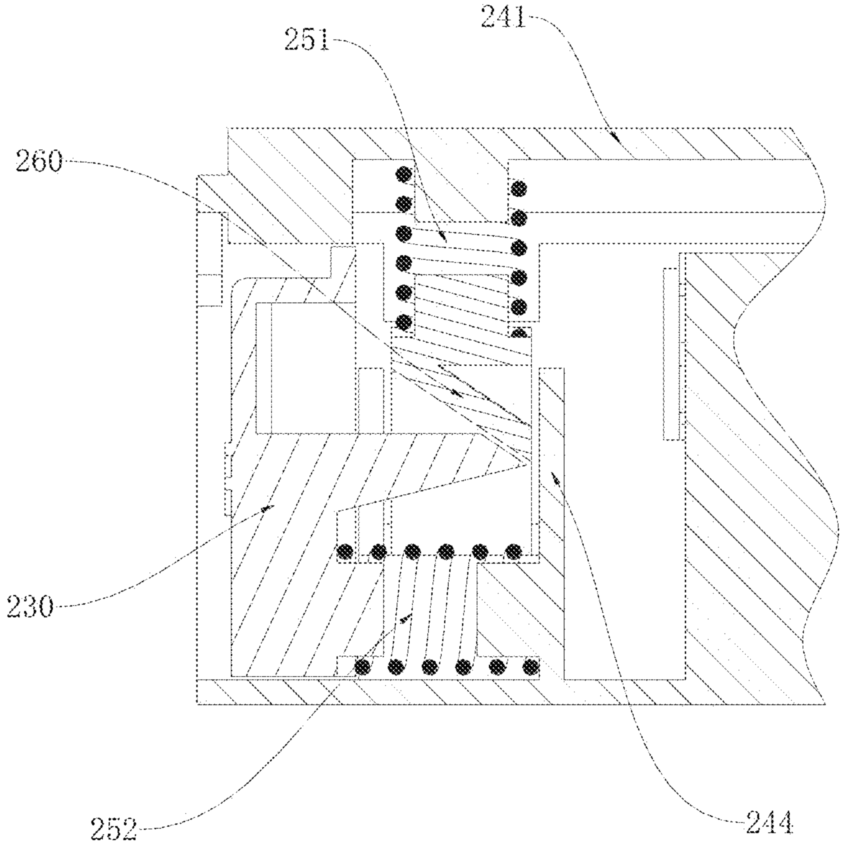
FIG. 8 is a partial enlarged view of another state of FIG. 5.
Figure 9:
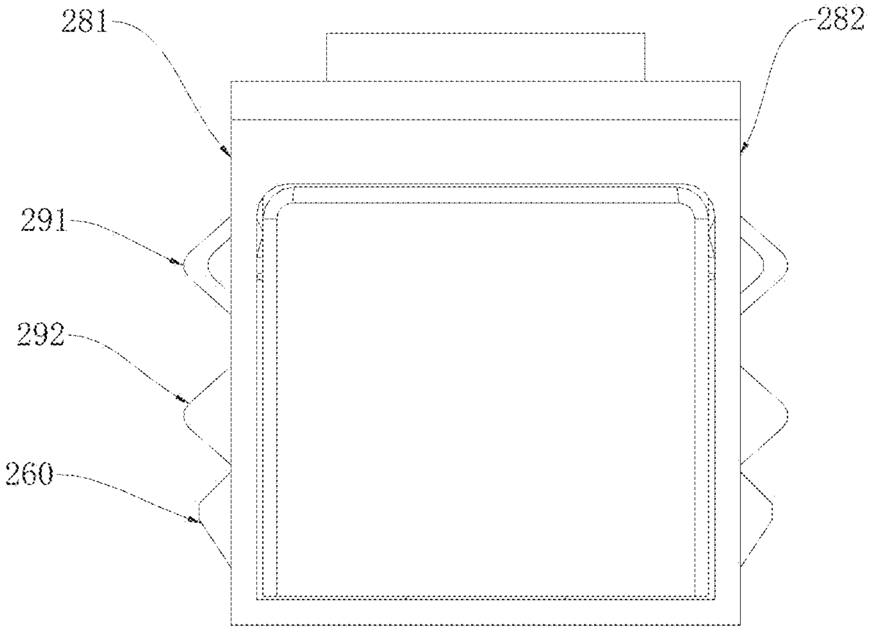
FIG. 9 is a side view corresponding to a state of FIG. 8.

As illustrated by FIGS. 1 to 9, an example of the present disclosure provides a track 100, an adapter 200 and a track light.

The track light includes the adapter 200 and a power supply device or a power consumption device. The power supply device can be a driving power supply for converting a voltage of the track 100 into a voltage suitable for working, such as converting 220V alternating current into required direct current. The power consumption device can be a light body 300 for lighting, or the power consumption device can also be other device such as a sensor module or monitoring device to provide corresponding other functions.

The track 100 is an installation member of the track light, and is used to install the track light to an installation foundation. The track light can be installed to the track 100 as required, and can slide in the track 100, and an installation position of the track light in the track 100 can be moved as required.

In a height direction, that is to say, in a direction perpendicular to the installation foundation, a side of the track 100 is provided with an installation portion 170, and another side of the track 100 is provided with a frame 180. The frame 180 encloses to form an accommodating space 110 with an opening direction that is away from the installation portion 170. The installation portion 170 is used to connect with the installation foundation, the installation foundation can be a ceiling or a wall. The accommodating space 110 is used for accommodating the adapter 200, and the track 100 is provided with a first magnetic attraction piece 120, the first magnetic attraction piece 120 is used for magnetically connecting with the adapter 200, and the track 100 is provided with a fastener holder 130, the fastener holder 130 is used for engaging with the adapter 200. The adapter 200 of the track light is accommodated in the accommodating space 110. The adapter 200 is provided with a second magnetic attraction piece 210 and a first fastener 220. The second magnetic attraction piece 210 is used for magnetically connecting with the first magnetic attraction piece 120, and the first fastener 220 extends or retracts in the adapter 200, so that the first fastener 220 has an extended state and a retracted state. In the case that the first fastener 220 is in the extended state, the first fastener 220 is used to engage with the fastener holder 130, in the case that the first fastener 220 is in the retracted state, the first fastener 220 is used to separate from the fastener holder 130.

The magnetic connection between the first magnetic attraction piece 120 and the second magnetic attraction piece 210 facilitates the installation of the adapter 200 in the track 100 and the sliding of the adapter 200 in the track 100, thus facilitating the installation and sliding of the track light in the track 100. One of the first magnetic attraction piece 120 and the second magnetic attraction piece 210 can be a permanent magnet and the other can be an iron sheet, and the permanent magnet and the iron sheet can be magnetically connected. Both the first magnetic attraction piece 120 and the second magnetic attraction piece 210 can be permanent magnets, and different magnetic poles of the two permanent magnets are oppositely arranged and can be magnetically connected. Of course, the first magnetic attraction piece 120 and the second magnetic attraction piece 210 can also be other types of magnetic attraction piece, which are not specifically limited in the example of the present disclosure.

In the extended state, the first fastener 220 and the fastener holder 130 are engaged to realize an auxiliary support for the adapter 200. Even if the magnetic attraction between the first magnetic attraction piece 120 and the second magnetic attraction piece 210 disappears or a weight of the track light is relatively heavy, the first fastener 220 and the fastener holder 130 can also realize the connection between the adapter 200 and the track 100, which can prevent the adapter 200 from falling off the track 100, thus preventing the track light from falling off the track 100.

In the retracted state, the first fastener 220 is separated from the fastener holder 130, and the first fastener 220 does not affect the installation of the adapter 200 into the track 100, nor does it affect the disassembly of the adapter 200 from the track 100.

Therefore, when it is needed to install the adapter 200 into the track 100 or remove the adapter 200 from the track 100, the first fastener 220 can be in the retracted state to facilitate the installation of the adapter 200 into the track 100 or the removal of the adapter 200 from the track 100, thus facilitating the installation of the track light into the track 100.

After the adapter 200 is installed in the track 100, the first magnetic attraction piece 120 and the second magnetic attraction piece 210 are magnetically connected to realize the connection between the adapter 200 and the track 100, in this case, the first fastener 220 is in the extended state, the engagement between the first fastener 220 and the fastener holder 130 also realizes the connection between the adapter 200 and the track 100. The engagement between the first fastener 220 and the fastener holder 130 can protect the adapter 200 and prevent the adapter 200 and the entire track light from falling off in the case that the magnetic attraction between the first magnetic attraction piece 120 and the second magnetic attraction piece 210 disappears or the weight of the track light is relatively heavy.

In the example of the present disclosure, the track 100 is provided with a power supply conductive terminal 140 arranged in the frame 180 and partially exposed in the accommodating space 110, and the power supply conductive terminal 140 extends along a length direction of the track 100, and the power supply conductive terminal 140 is used for electrically connecting with the adapter 200. The power supply conductive terminal 140 is used to supply power to the adapter 200, thereby supplying power to the track light.

Optionally, the track 100 is provided with a signal conductive terminal 150 arranged in the frame 180 and partially exposed in the accommodating space 110, and the signal conductive terminal 150 extends along the length direction of the track 100, and the signal conductive terminal 150 is used for electrically connecting with the adapter 200. The signal conductive terminal 150 is used for signal transmission with the adapter 200, thereby realizing signal transmission with the track light.

Specifically, an outer surface of the adapter 200 is provided with a power supply spring piece 291 and/or a signal spring piece 292, and the power supply spring piece 291 is in contact with the power supply conductive terminal 140, and the signal spring piece 292 is in contact with the signal conductive terminal 150. The power supply spring piece 291 and the signal spring piece 292 may have certain elasticity. In the case that the power supply spring piece 291 is in contact with the power supply conductive terminal 140, the power supply conductive terminal 140 exerts a certain force on the power supply spring piece 291, and a restoring force of the power supply spring piece 291 enables the power supply spring piece 291 to be better contact with the power supply conductive terminal 140, thus the reliable electrical connection can be realized. The position of the adapter 200 can also be moved under the condition of ensuring the electrical connection. In the case that the signal spring piece 292 is in contact with the signal conductive terminal 150, the signal conductive terminal 150 exerts a certain force on the signal spring piece 292, and a restoring force of the signal spring piece 292 enables the signal spring piece 292 to be better contact with the signal conductive terminal 150, thus the reliable signal connection can be realized. The position of the adapter 200 can also be moved under the condition of ensuring the signal connection.

The signal conductive terminal 150 and the signal spring piece 292 can be selectively arranged as required.

In the case that the track light needs to move on the track 100, the adapter 200 can be pushed to slide on the track 100, and the power supply spring piece 291 on the outer surface of the adapter 200 is always in contact with the power supply conductive terminal 140 of the track 100, and the signal spring piece 292 on the outer surface of the adapter 200 is always in contact with the signal conductive terminal 150 of the track 100, so that the position of the adapter 200 can be conveniently moved, and the power supply and signal transmission of the adapter 200 cannot be affected when the position of the adapter 200 is moved.

Further, the track 100 is provided with an insulation protection part 160 embedded in a sidewall 182 of the frame 180, and the insulation protection part 160 extends along the length direction of the track 100, and the power supply conductive terminal 140 and/or the signal conductive terminal 150 are/is embedded in the insulation protection part 160, and the power supply conductive terminal 140 and/or the signal conductive terminal 150 are/is partially exposed in the accommodating space 10. The insulation protection part 160 can play an isolation role, and isolate the track 100 from the power supply conductive terminal 140 and the signal conductive terminal 150, and the track 100 can be made of conductive material or insulating material, short circuit caused when the track 100 is made of conductive material can also be avoided.

The frame 180 includes a top wall 181 and two sidewalls 182 perpendicular to the top wall 181. The top wall 181 and the two sidewalls 182 perpendicular to the top wall 181 enclose the accommodating space 110. The first magnetic attraction piece is embedded in the top wall 181 adjacent to the installation portion 170, and the power supply conductive terminals and/or signal conductive terminals are respectively located on the two sidewalls 182. A certain position of the two sidewalls 182 protrudes inward to form the fastener holder 130, or ends of the two sidewalls 182 may be bent inward to form the fastener holder 130.

The adapter 200 is located in the accommodating space 110 and is coupled with the track 100, and the adapter 200 is used for electrically connecting with power supply device or power consumption device, so as to realize that the power supply device or power consumption device obtains electricity from the track 100.

In the example of the present disclosure, the adapter 200 is provided with the second magnetic attraction piece 210 at a top of the adapter 200 and the first fasteners 220 at two sides of the adapter 200, the second magnetic attraction piece 210 is used for magnetically connecting with the first magnetic attraction piece 120, and the first fasteners 220 can be extended or retracted from the adapter 200, so that the first fasteners 220 include the extended state and the retracted state, and in the case that the first fasteners 220 are in the extended state, the first fasteners 220 are used to engage with the fastener holders 130, and in the case that the first fasteners 220 are in the retracted state, the first fasteners 220 are used to separate from the fastener holders 130.

In the extended state, the first fasteners 220 and the fastener holders 130 are engaged to realize the auxiliary support for the adapter 200. Even if the magnetic attraction between the first magnetic attraction piece 120 and the second magnetic attraction piece 210 disappears or the weight of the track light is relatively heavy, the first fasteners 220 and the fastener holders 130 can realize the connection between the adapter 200 and the track 100, which can prevent the adapter 200 from falling off the track 100, thus preventing the track light from falling off the track 100.

In the retracted state, the first fasteners 220 are separated from the fastener holders 130, and the first fasteners 220 do not affect the installation of the adapter 200 into the track 100 or the removal of the adapter 200 from the track 100, thus facilitating the installation of the track light into the track 100 or the removal of the track light from the track 100.

Therefore, when it is needed to install the adapter 200 into the track 100 or remove the adapter 200 from the track 100, the first fasteners 220 can be in the retracted state to facilitate the installation of the adapter 200 into the track 100 and the installation of the track light into the track 100, or to facilitate the removal of the adapter 200 from the track 100 and the removal of the track light from the track 100.

After the adapter 200 is installed in the track 100, the first magnetic attraction piece 120 and the second magnetic attraction piece 210 are magnetically connected to realize the connection between the adapter 200 and the track 100, in this case, the first fasteners 220 are in the extended state, the engagement between the first fasteners 220 and the fastener holders 130 also realize the connection between the adapter 200 and the track 100. The engagement between the first fasteners 220 and the fastener holders 130 can protect the adapter 200 and prevent the adapter 200 from falling off in the case that the magnetic attraction between the first magnetic attraction piece 120 and the second magnetic attraction piece 210 disappears or the weight of the track light is relatively heavy, so as to prevent the track light from falling off.

Therefore, the mechanical connection between the adapter 200 and the track 100 can be realized through the above structure, and the adapter 200 and the track 100 also need to be electrically connected.

Specifically, two sides of the adapter 200 are provided with power supply spring pieces 291, and the track 100 is provided with power supply conductive terminals 140 which are arranged in the frame 180 and partially exposed in the accommodating space 110, and the power supply conductive terminals 140 extend along the length direction of the track 100, and the power supply spring pieces 291 are configured to be in contact with the power supply conductive terminals 140. Through this structure, the electrical connection between the adapter 200 and the track 100 can be realized.

Optionally, two sides of the adapter 200 are provided with signal spring pieces 292, and the track 100 is provided with signal conductive terminals 150 which are arranged in the frame 180 and partially exposed in the accommodating space 110, and the signal conductive terminals 150 extend along the length direction of the track 100, and the signal spring pieces 292 is configured to be in contact with the signal conductive terminals 150. Through this structure, the signal connection between the adapter 200 and the track 100 can be realized. The signal conductive terminals 150 and the signal spring pieces 292 can be selectively arranged as required.

The power supply spring pieces 291 and the signal spring pieces 292 may have certain elasticity. In the case that the power supply spring pieces 291 are in contact with the power supply conductive terminals 140, the power supply conductive terminals 140 exert the certain force on the power supply spring pieces 291, and the restoring force of the power supply spring pieces 291 enables the power supply spring pieces 291 to be better contact with the power supply conductive terminals 140, thus the reliable electrical connection can be realized. The position of the adapter 200 can also be moved under the condition of ensuring the electrical connection. In the case that the signal spring pieces 292 are in contact with the signal conductive terminals 150, the signal conductive terminals 150 exert the certain force on the signal spring pieces 292, and the restoring force of the signal spring pieces 292 enables the signal spring pieces 292 to be better contact with the signal conductive terminals 150, thus the reliable signal connection can be realized. The position of the adapter 200 can also be moved under the condition of ensuring the signal connection.

In the case that the track light needs to move on the track 100, the adapter 200 can be pushed to slide on the track 100, and the power supply spring pieces 291 on the outer surface of the adapter 200 are always in contact with the power supply conductive terminals 140 of the track 100, and the signal spring pieces 292 on the outer surface of the adapter 200 are always in contact with the signal conductive terminals 150 of the track 100, so that the position of the adapter 200 can be conveniently moved, and the power supply and signal transmission of the adapter 200 cannot be affected when the position of the adapter 200 is moved.

In the example of the present disclosure, a switching between the extended state and the retracted state of the first fastener 220 can be manually controlled or automatically controlled by a control device, which is not specifically limited in the example of the present disclosure.

Optionally, the adapter 200 is further provided with an operating part 230, the operating part 230 is cooperated with the first fastener 220, and the operating part 230 is used for driving the first fastener 220 to switch between the extended state and the retracted state. That is to say, the first fastener 220 can be driven to switch between the extended state and the retracted state through the operating part 230, so as to drive the first fastener 220 to the extended state or to the retracted state when needed.

In the example of the present disclosure, the adapter 200 includes a housing 240, and the first fastener 220 and the operating part 230 are arranged on the housing 240. The first fastener 220, the operating part 230 and the adapter 200 are integrated, and then are installed to the track 100 as an integral component, which is convenient for assembly.

The housing 240 includes a top plate 241 and a side plate 242. The second magnetic attraction piece 210 can be arranged on the top plate 241. The top plate 241 is connected with the first magnetic attraction piece 120 of the track 100 through the second magnetic attraction piece 210. The side plate 242 is provided with an opening 243. In the case that the first fastener 220 is in the extended state, the first fastener 220 extends out of the opening 243. In the case that the first fastener 220 is in the retracted state, the first fastener 220 retracts into the opening 243.

After the first fastener 220 extends out of the opening 243, a part of the first fastener 220 extending out of the opening 243 can be engaged with the fastener holder 130, so that the adapter 200 can be engaged with the track 100. After the first fastener 220 retracts into the opening 243, the first fastener 220 is separated from the fastener holder 130, and the adapter 200 is disconnected from the track 100, which is convenient for installing the adapter 200 into the track 100 or removing the adapter 200 from the track 100.

In the example of the present disclosure, the first fastener 220 is connected with the top plate 241 through a first spring piece 251, and the operating part 230 is connected with the side plate 242 through a second spring piece 252. A surface of the first fastener 220 that engaged with the operating part 230 is an inclined surface, and a surface of the first fastener 220 opposite to the side plate 242 is an inclined surface.

In the case that the operating part 230 moves in a first direction, the operating part 230 drives the first fastener 220 to move in a direction towards the top plate 241, and in the case that the first fastener 220 moves in the direction towards the top plate 241, the side plate 242 presses the first fastener 220 to retract into the opening 243. In the case that the operating part 230 moves in a second direction, the first spring piece 251 drives the first fastener 220 to move in a direction away from the top plate 241; in the case that the first fastener 220 moves in the direction away from the top plate 241, the first spring piece 251 drives the first fastener 220 to extend out of the opening 243, and the second direction is opposite to the first direction.

In the case that the adapter 200 needs to be installed on the track 100, the operating part 230 is pressed in the first direction, so that the second spring piece 252 is compressed, and the operating part 230 is in contact with the first fastener 220, because the surface of the first fastener 220 cooperated with the operating part 230 is the inclined surface, in the case that the operating part 230 moves in the first direction, the operating part 230 drives the first fastener 220 to move towards the top plate 241. The first spring piece 251 is compressed. In the case that the first fastener 220 moves towards the top plate 241, the side plate 242 presses the first fastener 220 to retract into the opening 243, and the first spring piece 251 is compressed. In this case, the adapter 200 can be installed on the track 100, and the adapter 200 and the track 100 can be magnetically connected by the first magnetic attraction piece 120 and the second magnetic attraction piece 210.

Then, the operating part is released, and the operating part 230 moves in the second direction due to the restoring force of the second spring piece 252, and the first fastener 220 moves away from the top plate 241 due to the restoring force of the first spring piece 251. In the case that the first fastener 220 moves in a direction away from the top plate 241, the first spring piece 251 further drives the first fastener 220 to extend out of the opening 243, and the second direction is opposite to the first direction.

The first direction may be a direction that an end of the adapter 200 where the operating part 230 is located points to a center of the adapter 200 along a length direction of the adapter 200, and the second direction may be a direction that the center of the adapter 200 points to the end of the adapter 200 where the operating part 230 is located along the length direction of the adapter 200. The first spring piece 251 and the second spring piece 252 may be springs.

In the example of the present disclosure, the side plate 242 is provided with a baffle plate 244, and the baffle plate 244 is cooperated with the first fastener 220, and the baffle plate 244 is used for preventing the first fastener 220 from moving in the first direction in the case that the operating part 230 moves in the first direction. That is to say, the baffle plate 244 and the operating part 230 are oppositely arranged, in the case that the operating part 230 moves in the first direction, the operating part 230 is cooperated with the inclined surface of the first fastener 220, but the baffle plate 244 can prevent the first fastener 220 from moving in the first direction, so the first fastener 220 can only move in the direction close to the top plate 241 in this case. On the one hand, the baffle plate 244 is cooperated with the first fastener 220, and the baffle plate 244 can prevent the first fastener 220 from moving in the first direction, so that the first fastener 220 can move in the direction close to the top plate 241 under the drive of the operating part 230; on the other hand, the baffle plate 244 can further guide the first fastener 220 to move in a direction of the baffle plate 244 in the case that the first fastener 220 is driven by the operating part 230, thus playing a guiding role for the first fastener 220.

In the example of the present disclosure, optionally, the adapter 200 is further provided with a second fastener 260, the second fastener 260 is engaged with the fastener holder 130 and is a spring fastener, and can be separated from the fastener holder 130 in the case that an external force on the second fastener 260 reaches a preset threshold.

The second fastener 260 engages with the fastener holder 130 and also supports the adapter 200. Together with the first fastener 220, the second fastener 260 supports the adapter 200. In the case that the magnetic attraction between the first magnetic attraction piece 120 and the second magnetic attraction piece 210 disappears or the weight of the track light is relatively heavy, the second fastener 260 engages with the fastener holder 130 to prevent the adapter 200 from falling off the track 100, thereby preventing the track light from falling off the track 100.

If the adapter 200 needs to be removed from the track 100, because the second fastener 260 is a spring fastener, a large force is applied to the adapter 200, in the case that the external force on the second fastener 260 reaches the preset threshold, the second fastener 260 can be separated from the fastener holder 130, and in this case, the adapter 200 can also be separated from the track 100. Therefore, the second fastener 260 can not only achieve the function of supporting, but also facilitate the separation of the adapter 200 from the track 100.

In the example of the present disclosure, the adapter 200 includes a first end 271 and a second end 272, the first end 271 and the second end 272 are arranged oppositely, the first fastener 220 is arranged at the first end 271, and the second fastener 260 is arranged at the second end 272. That is to say, the first fastener 220 is arranged at an end and the second fastener 260 is arranged at another end. The first fastener 220 is engaged with the fastener holder 130, which makes the connection between the adapter 200 and the track 100 more reliable. However, an installation structure of the first fastener 220 is more complicated, and an installation structure of the second fastener 260 is relatively simple, which can also play an auxiliary support role to some extent.

In the example of the present disclosure, the adapter 200 includes a first side surface 281 and a second side surface 282, which are oppositely arranged, and both the first side surface 281 and the second side surface 282 are provided with the first fasteners 220. That is to say, both the first side surface 281 and the second side surface 282 of the adapter 200 are provided with the first fasteners 220, so that the first fasteners 220 can reliably support the adapter 200 on two side surfaces.

Further, both the first side surface 281 and the second side surface 282 are provided with the second fasteners 260. That is to say, both the first side surface 281 and the second side surface 282 of the adapter 200 are provided with the second fasteners 260, so that the second fasteners 260 can reliably support the adapter 200 on two side surfaces.

Optionally, the first end 271, the first side surface 281 and the second side surface 282 of the adapter 200 are all provided with the first fasteners 220, the second end 272, the first side surface 281 and the second side surface 282 of the adapter 200 of the adapter 200 are all provided with the second fasteners 260, so that the adapter 200 includes at least four auxiliary support points, even if the magnetic attraction of the first magnetic attraction piece 120 and the second magnetic attraction piece 210 disappears, or the weight of the track light is relatively heavy, the four auxiliary support points can uniformly support the adapter 200.

In addition, in the example of the present disclosure, the first fastener 220 is connected with the top plate 241 through the first spring piece 251, even if the magnetic attraction of the first magnetic attraction piece 120 and the second magnetic attraction piece 210 disappears or the weight of the adapter 200 is so heavier that the first magnetic attraction piece 120 and the second magnetic attraction piece 210 are separated, that is to say, even if the top plate 241 of the adapter 200 is separated from the track 100, the first fastener 220 can support the adapter 200 by engaging with the fastener holder 130, and in this case, the first fastener 220 is connected with the top plate 241 through the first spring piece 251, the first spring piece 251 can play a buffering role for the adapter 200 and prevent internal structural members of the adapter 200 from being impacted.

In the example of the present disclosure, the track light includes the adapter 200, which is adapted to the track 100. The track light further includes power supply device or power consumption device. The power supply device can be a driving power supply for converting a voltage of the track 100 into a voltage suitable for working, for example, converting 220V alternating current into a required direct current. The power consumption device can be a light body 300 for lighting, or the power consumption device can also be other device such as sensor module or monitoring device to provide corresponding others functions. The power supply device or power consumption device is arranged in the adapter 200, and the power supply device or power consumption device is electrically connected with the adapter 200.

The power consumption device can be connected with the adapter 200 and directly supplied with power by the track 100 through the adapter 200, or the power consumption device can be connected with the adapter 200, and the voltage of the track is converted by the above-mentioned power supply device, and then power is supplied to the power consumption device.

Specifically, the power supply device may be provided inside the adapter 200, for example, inside the housing 240 of the adapter 200. The light body 300 can be below the accommodating space 110. The light body 300 can be directly connected with the adapter 200, and both the light body 300 and the adapter 200 can be located in the accommodating space 110, and a light-exiting surface of the light body 300 faces the opening of the accommodating space 110, or a part of the light body 300 extends out of the accommodating space 110 through the opening to realize illumination. In this case, the track light can be a linear light, a flat light, etc. Alternatively, the light body 300 can be connected with the adapter 200 through a connection rod, the adapter 200 is located in the accommodating space 110, and the light body 300 is located outside the accommodating space 110 to realize illumination. In this case, the track light can be a spotlight, etc.

The first magnetic attraction piece 120 of the track 100 and the second magnetic attraction piece 210 of the adapter 200 are magnetically connected, which facilitates the installation of the adapter 200 in the track 100 and the sliding of the adapter 200 in the track 100, thus facilitating the installation and sliding of the track light in the track 100. In the extended state, the first fastener 220 and the fastener holder 130 are engaged, so that even if the magnetic attraction between the first magnetic attraction piece 120 and the second magnetic attraction piece 210 disappears, the first fastener 220 and the fastener holder 130 can realize the connection between the adapter 200 and the track 100, and prevent the adapter 200 from falling off the track 100, thereby preventing the track light from falling off the track 100; in the retracted state, the first fastener 220 is separated from the fastener holder 130, and the first fastener 220 does not affect the installation of the adapter 200 into the track 100, nor does it affect the removal of the adapter 200 from the track 100, thus facilitating the installation and removal of the track light.

In the case that the track light needs to be installed in the track 100 or removed from the track 100, the first fastener 220 is in the retracted state. After the adapter 200 is installed in the track 100, the first magnetic attraction piece 120 and the second magnetic attraction piece 210 are magnetically connected, and the first fastener 220 is in the extended state to protect the track light and prevent the track light from falling off.

Moreover, the power supply spring pieces 291 are arranged on two sides of the adapter 200, and the track 100 is provided with the power supply conductive terminals 140 which are arranged in the frame 180 and partially exposed in the accommodating space 110, and the power supply conductive terminals 140 extend along the length direction of the track 100, and the power supply spring pieces 291 are configured to be contact with the power supply conductive terminals 140. Through this structure, the electrical connection between the adapter 200 and the track 100 can be realized.

Optionally, the signal spring pieces 292 are arranged on two sides of the adapter 200, and the track 100 is provided with the signal conductive terminals 150 which are arranged in the frame 180 and partially exposed in the accommodating space 110, and the signal conductive terminals 150 extend along the length direction of the track 100, and the signal spring pieces 292 are configured to be contact with the signal conductive terminals 150. Through this structure, the signal connection between the adapter 200 and the track 100 can be realized.

The first fastener 220 and the second fastener 260 assist in supporting the adapter 200. Even if the first magnetic attraction piece 120 and the second magnetic attraction piece 210 are separated, that is to say, even if the top plate 241 of the adapter 200 is separated from the track 100, the first fastener 220 is engaged with the fastener holder 130 and the second fastener 260 is engaged with the fastener holder 130, the adapter 200 can be supported, and in this case, the first fastener 220 is connected with the top plate 241 through the first spring piece 251, the first spring piece 251 can play a buffering role for the adapter 200 and prevent internal structural members of the adapter 200 from being impacted.

The present disclosure discloses a track light, which aims to solve the problem of potential safety hazard caused by the falling of the track light during the use process.

In order to solve the above problem, the present disclosure adopts the following technical solution.

A track, in a height direction, a side of the track is provided with an installation portion, and another side of the track is provided with a frame, the frame encloses to form an accommodating space with an opening direction that is away from the installation portion, the installation portion is used to connect with an installation foundation, the accommodating space is used for accommodating an adapter, and the track is provided with a first magnetic attraction piece, the first magnetic attraction piece is used for magnetically connecting with the adapter, and the track is provided with a fastener holder, the fastener holder is used for engaging with the adapter.

Optionally, the track is provided with a power supply conductive terminal and/or a signal conductive terminal arranged in the frame and partially exposed in the accommodating space, and the power supply conductive terminal and/or the signal conductive terminal extend/extends along a length direction of the track, and the power supply conductive terminal and the signal conductive terminal are used for electrically connecting with the adapter.

Optionally, the track is provided with an insulation protection part embedded in a sidewall of the frame, and the insulation protection part extends along the length direction of the track, and the power supply conductive terminal and/or the signal conductive terminal are/is embedded in the insulation protection part.

Optionally, the frame includes a top wall and two sidewalls perpendicular to the top wall, the first magnetic attraction piece is embedded in the top wall adjacent to the installation portion, and the power supply conductive terminals and/or signal conductive terminals are respectively located on the two sidewalls.

An adapter, used for electrically connecting with a power supply device or a power consumption device and coupled in the abovementioned track, so as to realize that the power supply device or the power consumption device obtains electricity from the track, the adapter is provided with a second magnetic attraction piece at a top of the adapter and first fasteners at two sides of the adapter, the second magnetic attraction piece is used for magnetically connecting with the first magnetic attraction piece, the first fasteners include an extended state and a retracted state, and in a case that the first fasteners are in the extended state, the first fasteners are used to engage with the fastener holder, and in a case that the first fasteners are in the retracted state, the first fasteners are used to separate from the fastener holder.

Optionally, two sides of the adapter are provided with power supply spring pieces and/or signal spring pieces, and the track is provided with power supply conductive terminals and/or signal conductive terminals which are arranged in the frame and partially exposed in the accommodating space, and the power supply conductive terminals and/or signal conductive terminals both extend along a length direction of the track, the power supply spring pieces are configured to be in contact with the power supply conductive terminals, and the signal spring pieces are configured to be in contact with the signal conductive terminals.

Optionally, the adapter is further provided with an operating part, the operating part is configured to be cooperated with the first fasteners, and the operating part is used for driving the first fasteners to switch between the extended state and the retracted state.

Optionally, the adapter includes a housing, and the first fasteners and the operating part are arranged on the housing, the housing includes a top plate and a side plate, the side plate is provided with an opening, in the case that the first fasteners are in the extended state, the first fasteners extend out of the opening, in the case that the first fasteners is in the retracted state, the first fastener retract into the opening.

Optionally, the first fasteners are connected with the top plate through a first spring piece, and the operating part is connected with the side plate through a second spring piece, a surface of the first fasteners that engaged with the operating part is an inclined surface, and a surface of the first fasteners opposite to the side plate is an inclined surface, in a case that the operating part moves in a first direction, the operating part drives the first fasteners to move in a direction towards the top plate, and in a case that the first fastener moves in a direction towards the top plate, the side plate presses the first fasteners to retract into the opening, in a case that the operating part moves in a second direction, the first spring piece drives the first fasteners to move in a direction away from the top plate, and in a case that the first fastener moves in a direction away from the top plate, the first spring piece drives the first fasteners to extend out of the opening, and the second direction is opposite to the first direction.

Optionally, the side plate is provided with a baffle plate, and the baffle plate is cooperated with the first fasteners, and the baffle plate is used for preventing the first fasteners from moving in the first direction in the case that the operating part moves in the first direction.

Optionally, the adapter is further provided with a second fastener, the second fastener is engaged with the fastener holder and is a spring fastener, and is able to be separated from the fastener holder in a case that an external force on the second fastener reaches a preset threshold, the adapter includes a first end and a second end, the first end and the second end are arranged oppositely, the first fasteners are arranged at the first end, and the second fastener is arranged at the second end.

A track light, including the abovementioned adapter, which is adapted to the abovementioned track, the track light further includes a power supply device or a power consumption device, the power supply device or the power consumption device is arranged in the adapter, and the power supply device or the power consumption device is electrically connected with the adapter, the second magnetic attraction piece is used for magnetically connecting with the first magnetic attraction piece, the first fasteners includes an extended state and a retracted state, and in a case that the first fasteners is in the extended state, the first fasteners are used to engage with the fastener holder, and in a case that the first fasteners are in the retracted state, the first fastener is used to separate from the fastener holder.

The technical solution adopted by the present disclosure can achieve the following beneficial effects.

In the present disclosure, the track is provided with the first magnetic attraction piece, the track light includes the adapter, the adapter is provided with the second magnetic attraction piece, and the first magnetic attraction piece and the second magnetic attraction piece are magnetically connected, so that the adapter is convenient to install in the track and slide in the track, thereby facilitating the installation and sliding of the track light in the track; the track is provided with the fastener holder, and the adapter is provided with the first fastener, which includes an extended state and a retracted state. In the case that the first fastener is in the extended state, the first fastener and the fastener holder are engaged, in the case that the first fastener is in the retracted state, the first fastener is separated from the fastener holder. In the extended state, the first fastener and the fastener holder are engaged to realize an auxiliary support for the adapter, even if the magnetic attraction between the first magnetic attraction piece and the second magnetic attraction piece disappears, the first fastener and the fastener holder can also realize the connection between the adapter and the track, which can prevent the adapter from falling off the track, thus preventing the track light from falling off the track. In the retracted state, the first fastener is separated from the fastener holder, and the first fastener does not affect the installation of the adapter into the track, nor does it affect the disassembly of the adapter from the track, thus facilitating the installation of the track light into the track, therefore, when it is needed to install the track light into the track or remove the track light from the track, the first fastener can be in the retracted state, after the adapter is installed in the track, the first magnetic attraction piece and the second magnetic attraction piece are magnetically connected, the first fastener is in the extended state, thus realizing the auxiliary support for the adapter, protecting the adapter and preventing the guide light from falling off.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above example of the present invention focuses on the differences among the examples, and the different optimization features among the examples can be combined to form a better example as long as they are not contradictory. Considering the brevity of the writing, the repeated portions are omitted herein.

The above is only an example of the present disclosure, and is not used to limit the present disclosure. Various modifications and variations will occur to those skilled in the art. Any modification, equivalent substitution, improvement, and the like made within the spirit and principle of the present disclosure should be included in the scope of the present disclosure.

The invention claimed is:

1. A track, comprising:

in a height direction, a side with an installation portion, and another side with a frame, and wherein the frame encloses to form an accommodating space with an opening direction that is away from the installation portion, the installation portion is used to connect with an installation foundation, and the accommodating space is used for accommodating an adapter;

a first magnetic attraction piece, wherein the first magnetic attraction piece is used for magnetically connecting with the adapter; and a fastener holder, wherein the fastener holder is used for engaging with the adapter, wherein the adapter comprises a housing, and first fasteners and an operating part arranged on the housing, wherein the first fasteners are configured to engage with the fastener holder, and the operating part is configured to be cooperated with the first fasteners, wherein the first fasteners are connected with a top plate of the housing through a first spring piece, the operating part is connected with a side plate of the housing through a second spring piece, a surface of the first fasteners that engaged with the operating part is an inclined surface, and a surface of the first fasteners opposite to the side plate is an inclined surface.

2. The track according to claim 1, further comprising a power supply conductive terminal and/or a signal conductive terminal arranged in the frame and partially exposed in the accommodating space, and wherein the power supply conductive terminal and/or the signal conductive terminal extend/extends along a length direction of the track, and the power supply conductive terminal and the signal conductive terminal are used for electrically connecting with the adapter.

3. The track according to claim 2, further comprising an insulation protection part embedded in a sidewall of the frame, and wherein the insulation protection part extends along the length direction of the track, and the power supply conductive terminal and/or the signal conductive terminal are/is embedded in the insulation protection part.

4. The track according to claim 2, wherein the frame comprises a top wall and two sidewalls perpendicular to the top wall, the first magnetic attraction piece is embedded in the top wall adjacent to the installation portion, and the power supply conductive terminals and/or signal conductive terminals are located on the two sidewalls.

5. An adapter, used for electrically connecting with a power supply device or a power consumption device and coupled in a track, wherein the track comprises, in a height direction, a side with an installation portion, and another side with a frame, and wherein the frame encloses to form an accommodating space with an opening direction that is away from the installation portion, the installation portion is used to connect with an installation foundation, and the accommodating space is used for accommodating the adapter;

a first magnetic attraction piece, wherein the first magnetic attraction piece is used for magnetically connecting with the adapter; and a fastener holder, wherein the fastener holder is used for engaging with the adapter, and wherein the adapter realizes that the power supply device or the power consumption device obtains electricity from the track, and the adapter further comprises a housing, and first fasteners and an operating part arranged on the housing, wherein the first fasteners are configured to engage with the fastener holder, and the operating part is configured to be cooperated with the first fasteners, wherein the first fasteners are connected with a top plate of the housing through a first spring piece, the operating part is connected with a side plate of the housing through a second spring piece, a surface of the first fasteners that engaged with the operating part is an inclined surface, and a surface of the first fasteners opposite to the side plate is an inclined surface.

6. The adapter according to claim 5, wherein two sides of the adapter are provided with power supply spring pieces and/or signal spring pieces, and the track is provided with power supply conductive terminals and/or signal conductive terminals which are arranged in the frame and partially exposed in the accommodating space, and the power supply conductive terminals and/or signal conductive terminals both extend along a length direction of the track, the power supply spring pieces are configured to be in contact with the power supply conductive terminals, and the signal spring pieces are configured to be in contact with the signal conductive terminals.

7. The adapter according to claim 5, wherein the operating part is used for driving the first fasteners to switch between an extended state and an retracted state, in a case that the first fasteners are in the extended state, the first fasteners are engaged with the fastener holder, and in a case that the first fasteners are in the retracted state, the first fasteners are separate from the fastener holder.

8. The adapter according to claim 7, wherein the side plate of the housing is provided with an opening, and in a case that the first fasteners are in the extended state, the first fasteners extend out of the opening, and in a case that the first fasteners is in the retracted state, the first fastener retract into the opening.

9. The adapter according to claim 8, wherein in a case that the operating part moves in a first direction, the operating part drives the first fasteners to move in a direction towards the top plate, and the side plate presses the first fasteners to retract into the opening, and in a case that the operating part moves in a second direction, the first spring piece drives the first fasteners to move in a direction away from the top plate, and the first spring piece drives the first fasteners to extend out of the opening, and the second direction is opposite to the first direction.

10. The adapter according to claim 9, wherein the side plate is provided with a baffle plate, and the baffle plate is cooperated with the first fasteners, and the baffle plate is used for preventing the first fasteners from moving in the first direction in the case that the operating part moves in the first direction.

11. The adapter according to claim 5, further comprising a second fastener, wherein the second fastener is engaged with the fastener holder and is a spring fastener, and is capable of being separated from the fastener holder when an external force on the second fastener reaches a preset threshold, and wherein the adapter further comprises a first end and a second end, the first end and the second end are arranged oppositely, the first fasteners are arranged at the first end, and the second fastener is arranged at the second end.

12. A track light, comprising an adapter which is adapted to a track, wherein:

the track comprises, in a height direction, a side with an installation portion, and another side with a frame, and wherein the frame encloses to form an accommodating space with an opening direction that is away from the installation portion, the installation portion is used to connect with an installation foundation, and the accommodating space is used for accommodating the adapter;

a first magnetic attraction piece, wherein the first magnetic attraction piece is used for magnetically connecting with the adapter; and a fastener holder, wherein the fastener holder is used for engaging with the adapter, and the adapter is used for electrically connecting with a power supply device or a power consumption device and coupled in the track, and the adapter realizes that the power supply device or the power consumption device obtains electricity from the track, and the adapter further comprises a housing, and first fasteners and an operating part arranged on the housing, wherein the first fasteners are configured to engage with the fastener holder, and the operating part is configured to be cooperated with the first fasteners, wherein the first fasteners are connected with a top plate of the housing through a first spring piece, the operating part is connected with a side plate of the housing through a second spring piece, a surface of the first fasteners that engaged with the operating part is an inclined surface, and a surface of the first fasteners opposite to the side plate is an inclined surface; and the track light further comprises a power supply device or a power consumption device, the power supply device or the power consumption device is arranged in the adapter, and the power supply device or the power consumption device is electrically connected with the adapter.

* * * * *